(12) United States Patent
Giralico et al.

(10) Patent No.: US 7,384,551 B2
(45) Date of Patent: Jun. 10, 2008

(54) TRAPEZOID SETTLER APPARATUS AND METHOD FOR SOLVENT EXTRACTION

(75) Inventors: Michael A. Giralico, Rochester, NY (US); Bernd Gigas, Rochester, NY (US); Michael Joseph Preston, Churchville, NY (US)

(73) Assignee: SPX Corporation, Charlotte, NC (US)

( * ) Notice: Subject to any disclaimer, the term of this patent is extended or adjusted under 35 U.S.C. 154(b) by 491 days.

(21) Appl. No.: 10/950,498

(22) Filed: Sep. 28, 2004

(65) Prior Publication Data

US 2006/0065610 A1    Mar. 30, 2006

(51) Int. Cl.
*B01D 36/04* (2006.01)
*B01D 17/25* (2006.01)

(52) U.S. Cl. .............. 210/335; 210/519; 210/521; 210/532.1; 210/538; 210/DIG. 5

(58) Field of Classification Search ........... 210/194, 210/295, 299–301, 320, 335, 519, 521, 522, 210/532.1, 538–540, 456, 799, DIG. 5, 241, 210/708
See application file for complete search history.

(56) References Cited

U.S. PATENT DOCUMENTS

| | | | | | |
|---|---|---|---|---|---|
| 1,437,008 | A | * | 11/1922 | Otterson | 210/241 |
| 2,713,919 | A | * | 7/1955 | Walker et al. | 95/252 |
| 3,256,997 | A | * | 6/1966 | Pall et al. | 210/494.1 |
| 3,405,059 | A | * | 10/1968 | Sprow | 210/708 |
| 4,333,835 | A | * | 6/1982 | Lynch | 210/305 |
| 5,296,150 | A | * | 3/1994 | Taylor, Jr. | 210/708 |
| 5,730,878 | A | * | 3/1998 | Rice | 210/662 |
| 6,907,997 | B2 | * | 6/2005 | Thacker et al. | 210/521 |
| 6,997,328 | B2 | * | 2/2006 | Wilcher et al. | 210/519 |

* cited by examiner

*Primary Examiner*—Joseph Drodge
(74) *Attorney, Agent, or Firm*—Baker & Hostetler LLP

(57) ABSTRACT

An embodiment of the invention includes a trapezoid settler having a longitudinal axis, a base, a first side wall oriented at an angle to the longitudinal axis, a second side wall opposing the first side wall and oriented at an angle to the longitudinal axis, and a coalescence fence connected to the first side wall and the second side wall. The coalescence fence has a first screen, a second screen oriented generally parallel to the first screen, and a media disposed between the first screen and the second screen.

19 Claims, 6 Drawing Sheets

TRAPEZOID SETTLER APPARATUS AND METHOD FOR SOLVENT EXTRACTION

FIELD OF THE INVENTION

The present invention relates generally to an apparatus and method for solvent extraction. More particularly, the present invention relates to an improved trapezoid settler design for the extraction of a desired product from a solvent or the like.

BACKGROUND OF THE INVENTION

Solvent extraction is used in many industrial processes to recover a desired product that is dissolved in a solvent stream. For example, the mining of copper employs a multi-step solvent extraction process which typically involves the leaching of copper from copper ore using an acidic aqueous solution to form a copper loaded leach liquor. The copper is typically extracted from the leach liquor by an organic solvent mixed with an organic extractant that is specific for copper. The copper loaded organic solvent is then stripped of copper by an acidic aqueous solution to form a copper loaded electrolyte solution. The copper loaded electrolyte solution is then sent to an electrowinning stage, where the copper is electroplated onto a copper cathode.

In order to transfer copper from one solvent to the next as previously described, the two solvents are thoroughly mixed to increase the surface area interface between the two solvent phases. The mixed solvents are then allowed to separate so that the two solvent phases can be transferred to the next stage of the extraction process without cross contamination of downstream solvent streams. In order to achieve phase separation as previously described, the mixed solvent stream is fed into a specially designed settler where the two phases are given enough time to properly separate. The settler is designed to enhance phase separation by providing a solvent flow that is slow in order to reduce turbulence, which has a tendency to remix the two phases. Furthermore, the slow solvent flow allows for an adequate residence time in the settler which assists in phase separation. In addition, the aforementioned settlers attempt to reduce the recirculation of the solvent stream because recirculation can reduce the effective size of the settler.

The aforementioned extraction process can have drawbacks, however. The organic solvent and extractant are relatively expensive, and furthermore, recirculation, which reduces the effective size of the settler, oftentimes results in the use of a larger settler than otherwise would be required. A larger settler has a larger working volume, requiring the use of a larger amount of solvent, which increases costs.

Accordingly, it is desirable to provide a method and apparatus for separation that produces little recirculation while providing a decelerated, unidirectional flow. It is further desirable to provide a cost efficient settler apparatus having an effective operational volume.

SUMMARY OF THE INVENTION

The foregoing needs are met, to a great extent, by the present invention, wherein aspects of a trapezoid settler apparatus and method are provided.

In accordance with one embodiment of the present invention, a trapezoid settler apparatus is provided. The trapezoid settler has a longitudinal axis that extends between an upstream region and a downstream region. The trapezoid settler additionally includes a base that lies in a generally horizontal plane, wherein the base has a downstream end and an upstream end. A weir assembly is located at the downstream end of the base at a first axial position. The apparatus also includes a first side wall, having a first inner face. The first side wall extends between the upstream end of the base and the weir assembly, where the first side wall is oriented at a first angle to the longitudinal axis. The trapezoid settler apparatus includes a second side wall opposing the first side wall, having a second inner face. The second side wall extends between the upstream end of the base and the weir assembly, where the second side wall is oriented at a second angle to the longitudinal axis. A first coalescence fence is connected to the first side wall and the second side wall, where the first coalescence fence extends between each inner face of the first and second side walls at a second axial position along the longitudinal axis. The first coalescence fence has a first screen along with a second screen oriented generally parallel to the first screen, with media disposed between the first screen and the second screen.

In accordance with another embodiment of the present invention, a method of separating a mixture is provided. The method comprises the steps of: feeding the mixture into a trapezoid settle and passing the mixture through a first coalescence fence. The coalescence fence comprises a first screen, a second screen, and a media disposed between the first screen and the second screen. Then the mixture is separated into a first phase and a second phase, wherein an interface region exists between the first phase and the second phase. Crud accumulation is removed at the interface region between the first phase and the second phase. The separated first phase and second phase is then collected in a weir assembly.

In accordance with another embodiment of the present invention, a method of retrofitting a rectangular settler having an interior, a first rectangular sidewall, and a second rectangular sidewall is provided. The method is comprised of constructing a first side wall, having two substantially straight sections positioned at an angle to one another, inside the interior of the rectangular settler, wherein a first triangular gap is formed between the first side wall and the rectangular first side wall. Furthermore, a second side wall, having two substantially straight sections positioned at an angle to one another, is constructed inside the interior of the rectangular settler, wherein a second triangular gap is formed between the second side wall and the rectangular second side wall. A first coalescence fence is placed between the first side wall and the second side wall, wherein the first coalescence fence is comprised of a first screen, a second screen parallel to the first screen, and a media disposed between the first screen and the second screen.

In accordance with yet another embodiment of the present invention, a trapezoid settler having a longitudinal axis is provided. The trapezoid settler is comprised of a means for feeding the mixture into a trapezoid settler and a means for passing the mixture through a first coalescence fence comprising a first screen means, a second screen means, and a media disposed between the first screen means and the second screen means. The trapezoid settler is further comprised of a means for allowing the mixture to separate into a first phase and a second phase, wherein an interface region exists between the first phase and the second phase. A means for removing crud accumulation at the interface between the first phase and the second phase and a means for collecting the separated first phase and second phase in a weir assembly is further provided.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
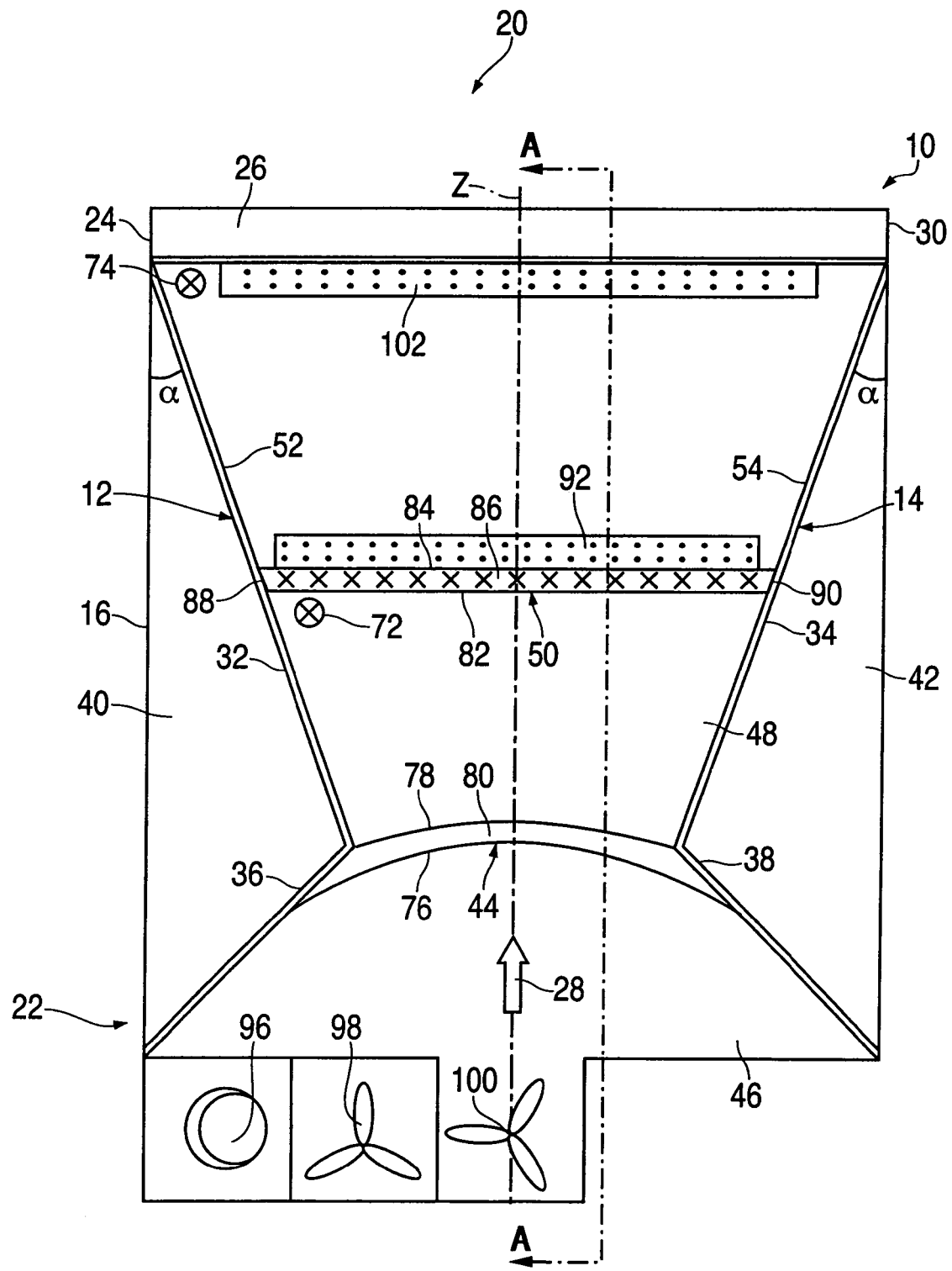
FIG. 1 is a top view of a retrofit trapezoid settler in accordance with an embodiment of the present invention.

The invention will now be described with reference to the drawing figures, in which like reference numerals refer to like parts throughout. One embodiment of the present invention provides a trapezoid settler for use with solvent extraction processes. While the apparatus and method are preferably used in solvent extraction processes, the trapezoid apparatus may be employed in various other separation processes that require the separation of fluid streams, for example.

An embodiment of the present apparatus is illustrated in FIG. 1. FIG. 1 is a top view of a trapezoid settler apparatus, generally designated 10, having a longitudinal axis Z. In the embodiment depicted, the trapezoid settler apparatus 10 includes side walls 12 and 14. As illustrated in FIG. 1, the sidewalls 12 and 14 engage sidewalls 16 and 18 of a standard rectangular settler that has been retrofitted, in accordance with the present invention, to provide a trapezoid configuration. However, as discussed in connection with FIG. 5 below, alternative embodiments of the present invention do not employ the side walls 16 and 18, for example, non-retrofit installations.

As illustrated in FIG. 1, the side wall 12 and 14 are generally symmetrical about the longitudinal axis Z. The side wall 12 has a downstream end 20 and an upstream end 22, wherein the downstream end 20 is connected to a first end 24 of a discharge weir assembly 26. The direction of solvent flow, generally designated 28 through the settler 10 is generally parallel to the longitudinal axis Z, starting from the upstream end 22 to the downstream end 20. Similarly, the side wall 14 also includes a downstream end, generally designated 20, and an upstream end, generally designated 22, wherein the downstream end 20 of the trapezoid settler 10 is connected to a second end 30 of the discharge weir assembly 26. The first side wall 12 and the second side wall 14 of the trapezoid settler 10 each have a first section 32 and 34, that are angled in a first direction inward toward one another away from walls 16 and 18. The angle α between the side walls 12 and 16 and the side walls 14 and 18 can range from zero to eighty two degrees, but the angle α is preferably between eleven and seventeen degrees. The side walls 12 and 14 also include a second section 36 and 38, as illustrated in FIG. 1, that is angled in a second opposite direction and extends toward the upstream end 22. The aforementioned orientation of the side walls 12 and 14 provide the settler apparatus 10 with a generally trapezoid shape. As illustrated in FIG. 1, the second sections 36 and 38 extend toward the upstream end 22 where they engage sidewalls 16 and 18 to define a cavity between walls 12 and 16, and 14 and 18, respectively. Fill, generally designated 40 and 42, is disposed between the two cavities formed between the side walls 12 and 16 and the side walls 14 and 18, providing additional structural stability. The fill 40 and 42 can be made of concrete, foam, resin, plastic, sand, or any other suitable material.

As depicted in FIG. 1, the second sections 36 and 38 of the side walls 12 and 14 are connected to a primary coalescence fence 44 which extends there between, dividing the trapezoid settler 10 into two compartments, an inlet compartment 46 and a main settler compartment 48. The main settler compartment 48 includes a secondary coalescence fence 50, positioned between the primary coalescence fence 44 and the discharge weir assembly 26. The secondary coalescence fence 50 extends between the side walls 12 and 14, wherein one end of the secondary coalescence fence 50 is connected to the inner face 52 of the side wall 12 while the other end of the secondary coalescence fence 50 is connected to the inner face 54 of the side wall 14.

Figure 2:
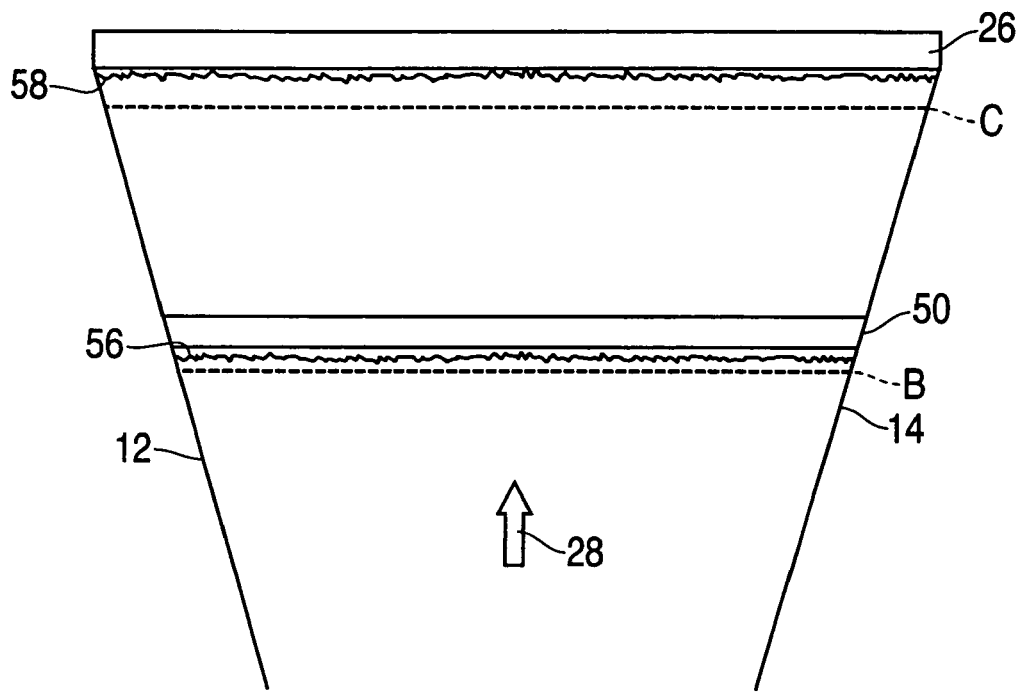
FIG. 2 is a top view of a portion of the trapezoid settler depicted in FIG. 1 with a secondary coalescence fence and a weir assembly, in accordance with one embodiment of the present invention.
Figure 3:
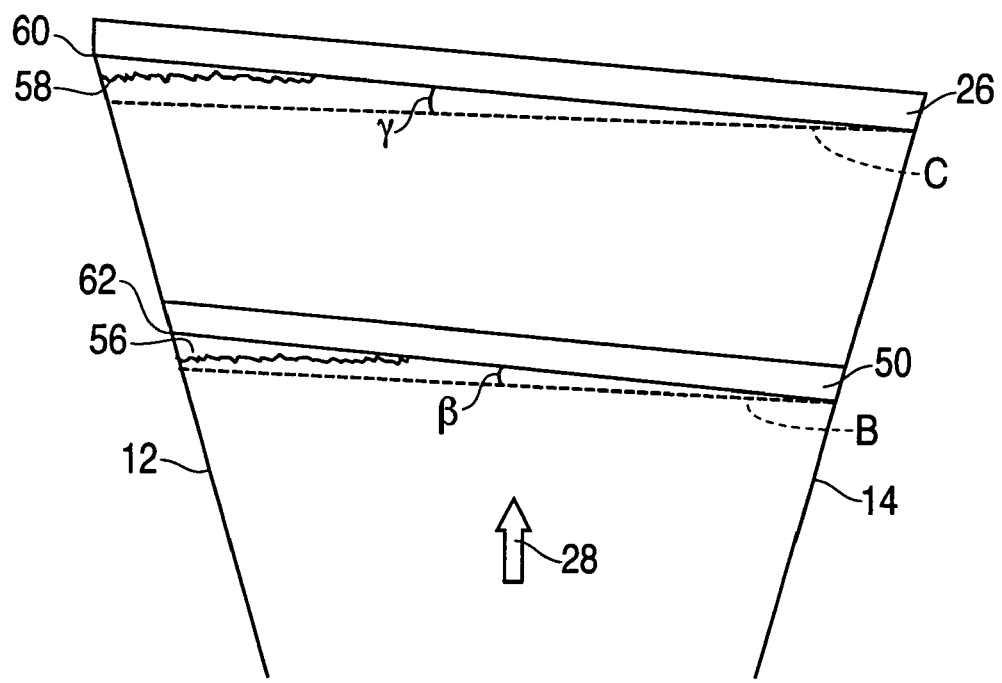
FIG. 3 is a top view of a portion of the trapezoid settler depicted in FIG. 1 with a secondary coalescence fence and a weir assembly oriented at an angle to the axial axis, in accordance with an alternative embodiment of the present invention.

Referring now to FIG. 2, an embodiment is depicted wherein the secondary coalescence fence 50 is oriented generally parallel to the transverse plane B whereas the weir assembly is oriented generally parallel to the transverse plane C. Alternatively, FIG. 3 depicts an embodiment of the present invention where the secondary coalescence fence 50 and discharge weir assembly 26 are positioned at angles β and γ to the transverse planes B and C, respectively. The angles β and γ are approximately zero degrees to approximately ten degrees. More preferably, the angles β and γ are approximately one degree to approximately two degrees. The angled surface of the secondary coalescence fence 50 and discharge weir assembly 26 function to funnel crud 56 and 58 into the downstream corner 60, formed by the intersection between the discharge weir assembly 26 and the side wall 12, and the downstream corner 62 formed by the intersection between the secondary coalescence fence 50 and the side wall 12.

Figure 4:
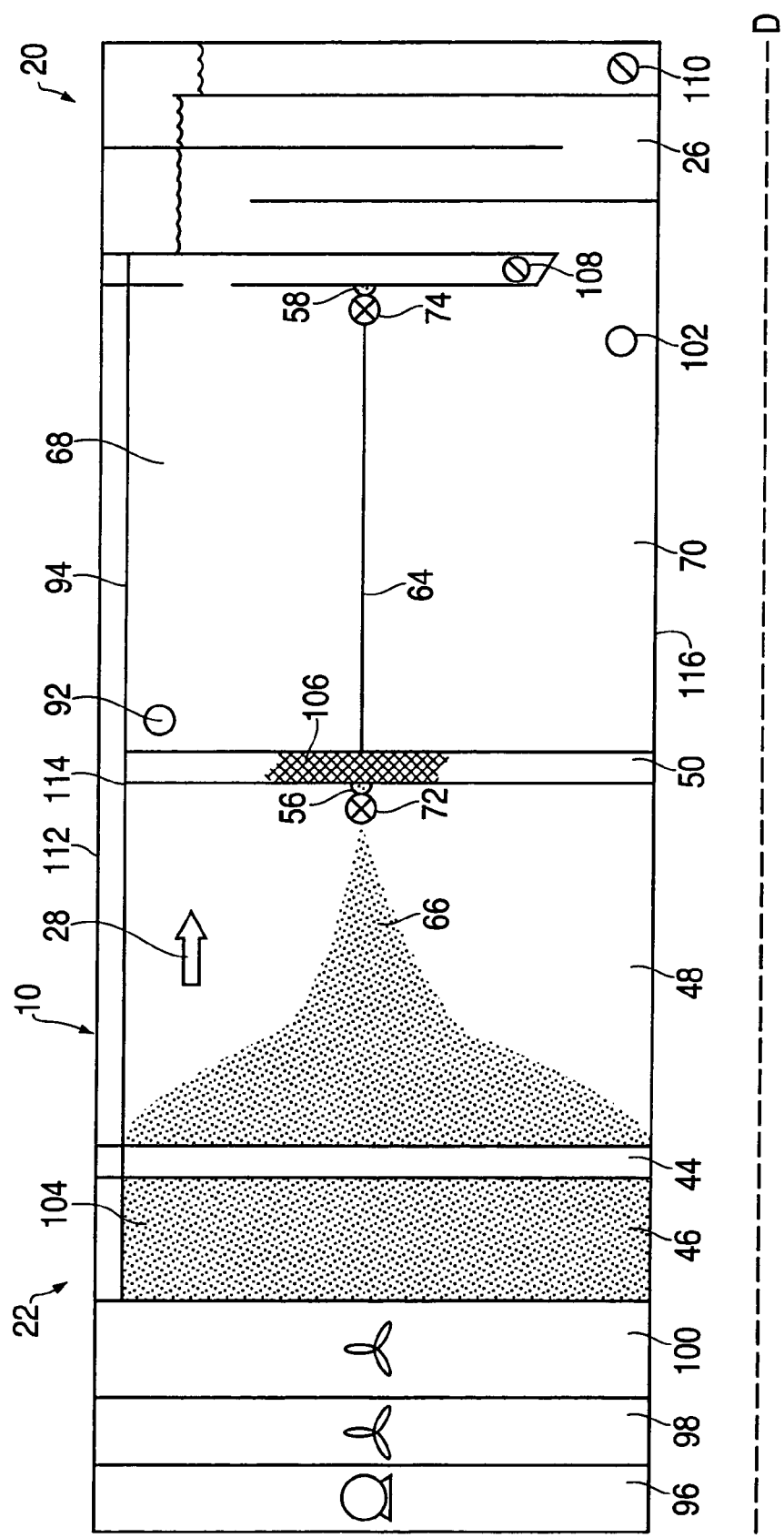
FIG. 4 is a cross-sectional view of a trapezoid settler depicted in FIG. 1 taken along line A-A.

Referring now to FIG. 4, a cross-sectional view along line A-A of the trapezoid settler apparatus 10 illustrated in FIG. 1 is depicted. The direction of solvent flow 28, through the settler 10 as indicated, is from the upstream end 22 to the downstream end 20. During operation of the settler apparatus 10, crud 56 and 58, which is can include entrapped air, solid particulates, and associated liquids, can collect at the interface 64 or dispersion band 66 between the liquid phases 68 and 70. Due to the aforementioned angled configuration, crud 56 and 58 generally collects at the downstream corners 60 and 62 as previously described in connection with FIG. 3. At each corner 60 and 62, a crud removal system 72 and 74 is preferably employed, as illustrated in FIG. 4. The crud removal systems 72 and 74 use an automated differential float to trigger a diaphragm pump to withdraw the crud 56 and 58 for a set time period based on a pre-programmed low level set point. The aforementioned removal of the crud 56 and 58 helps to prevent the likelihood of the contamination of the downstream processes which can affect the purity of the final product. The aforementioned removal of the crud 56 and 58 also helps to prevent the likelihood of disruption of the coalescence process, wherein the crud 56 and 58 can interfere with the transfer of one phase to the other phase at the interface 64. These crud removal systems 72 and 74 may also be employed in the embodiment depicted in FIG. 2.

As illustrated in FIGS. 1 and 4, the primary coalescence fence 44 has an upstream inlet screen 76, a downstream outlet screen 78, and media 80 disposed between the inlet screen 76 and outlet screen 78. Under hydrophobic conditions, the inlet screen 76, the outlet screen 78, along with the media 80 are preferably made of metal, for example steel or stainless steel. The inlet screen 76 and outlet screen 78 are made from an expanded metal grating or perforated metal mesh when employed under hydrophobic conditions. The packed media 80 is preferably made of packed metal filaments. Alternatively, the inlet screen 76, the outlet screen 78 and the packed media 80 of the primary coalescence fence 44 can be constructed from plastic or fiber reinforced plastic under hydrophilic conditions. For example, the inlet screen 76 and outlet screen 78 may be made from a molded or extruded plastic grating or mesh, or a molded or extruded fiber reinforced plastic grating or mesh. Under these conditions, the packed media 80 is similarly made of packed plastic or packed plastic filaments. Although the packed media is made of metal or plastic in the above-described embodiments of the invention, the packed media can alternatively be constructed from glass or any other suitable material The primary coalescence fence 44 is preferably designed with computational fluid dynamics to achieve relatively uniform flow velocity out of the outlet screen 78. Both the slot size and/or pore size of the inlet screen 76 and outlet screen 78 can be varied to control headloss, which aids coalescence, and provides a relatively uniform flow velocity. Although the primary coalescence fence 44 is generally parabolic in shape in the embodiments as depicted in FIGS. 1 and 4, the fence 44 can be any desired configuration such as trapezoid, angled, or some other suitable shape or configuration which aids in achieving relatively uniform flow velocity.

The secondary coalescence fence 50, as illustrated in FIGS. 1 and 4, is preferably constructed from a single variable permeability screen. Though a variable permeability screen is preferred, a secondary coalescence fence 50 having a three layer design with an inlet screen 82, an outlet screen 84, and packed media 86 in between the inlet screen 82 and the outlet screen 84, as previous described, may also be used. The secondary coalescence fence 50 may also be designed using computational fluid dynamics to provide a design that both holds and controls the dispersion band 66 located between the light phase 68 and heavy phase 70.

As illustrated in FIGS. 1 and 4, the secondary fence 50 includes jacking screws 88 and 90 at both ends, allowing the fence height to be adjusted to correspond with the location of the dispersion band 66. This adjustment helps to prevent the top of the secondary coalescence fence 50 from breaking the liquid surface 94, while allowing one to adjust the distance of the bottom of the secondary coalescence fence 50 from the base 116 of the settler 10.

Referring to FIG. 4, a light phase recycle launder 92 is depicted. The light phase recycle launder 92 is located on the back side of the secondary coalescence fence 50, just below the liquid surface 94. The light phase recycle launder 92 preferably includes a perforated pipe and manifold assembly that allows a portion of the light phase 68 to be piped back to pumper-mixer tanks 96, 98, and 100.

The settler apparatus 10 as illustrated in FIG. 1, also includes a heavy phase recycle launder 102 that is located opposite the light phase recycle launder 92, on the front side of the discharge weir assembly 26, near the bottom of the settler 10. The heavy phase recycle launder 102 similarly comprises a perforated pipe and manifold assembly that allows a portion of the heavy phase 70 to be piped back to the pumper-mixer tanks 96, 98, and 100.

The recycle launders 92 and 102 generally provide for increased control over the extraction process. For example, increasing the rate of recycle of the process stream generally increases the efficiency of extraction. In effect, the recycled portion of the process stream is subjected to a second extraction. The recycle launders 92 and 102 also generally help to dampen the effects to downstream processes from fluctuations in upstream process conditions.

As previously discussed, FIG. 4 is a cross-sectional view of the settler apparatus 10 along line A-A. During operation of the settler apparatus 10, the pumper-mixers 96, 98, and 100 mix the light phase 68 and heavy phase 70 to form a light-heavy mixture 104. The mixers 98 and 100 are preferably impellers, and the mixers 98 and 100 can be placed in separate mixing tanks or in a tank combined with the pumper 96. The mixture 104 is then fed into the inlet compartment 46 by the pumper-mixers 96, 98, and 100. The mixture 104 then proceeds to pass through the primary coalescence fence 44, which provides the initial headloss that aids coalescence, along with providing a relatively uniform velocity flow out of the fence 44 and into the main settler compartment 48. As the mixture 104 coalesces into two separate phases 68 and 70 as indicated in FIG. 4, a dispersion band 66 of the remaining unseparated mixture 104 forms between the light phase 68 and the heavy phase 70.

The mixture 104 then passes through the secondary coalescence fence 50. As previously mentioned, the height of the secondary coalescence fence 50 may be adjusted with the jacking screws 88 and 90 so that the controlling media 106 of the fence 50 is aligned with the dispersion band 66. This realignment allows for the dispersion band 66 to be located near the front side of the secondary coalescence fence 50, enabling the crud removal system 72 to remove the crud accumulation 56 at the fence 50.

Once the mixture 104 passes through the secondary coalescence fence 50, it is substantially separated into a light phase 68 and heavy phase 70 with an interface 64 there between. At this stage, a portion of the light phase 68 is fed back into the pumper mixer 96, 98, and 100 by the light phase recycle launder 92, as previously described. The separated mixture 104, with the light phase 68 and heavy phase 70, then passes into the discharge weir assembly 26, which collects the light phase 68 in a first drain 108 and the heavy phase 70 in a second drain 110.

As illustrated in FIG. 4, a second crud removal system 74 is positioned at the front of the discharge weir assembly 26 and at the interface 64. The second crud removal system 74 functions to remove the crud accumulation 58 located at the weir assembly 26. In addition, a portion of the heavy phase 70 is fed back into the pumper mixer 96, 98, and 100 by the heavy phase recycle launder 102.

Referring to FIG. 4, a cover 112 is preferably placed over the settler 10 in the embodiment depicted. The cover 112 functions to reduce evaporation of the light phase 68, reduce air 114 entrainment by reducing the agitation of the liquid surface 94, and to reduce the contamination of the two phases 68 and 70 by particulate matter. Though a cover 112 is preferred, alternative embodiments may not employ a cover 112 or covering means.

As illustrated in FIG. 1, the settler apparatus 10 also includes a base 116 that lies substantially in a horizontal plane D, but in other embodiments encompassed by the present invention, the base 116 may be sloped either upward at an angle to the plane, or downward at an angle to the plane. The aforementioned sloped configuration allows further control of the phase flows, interfacial velocities, and coalescence.

Figure 5:
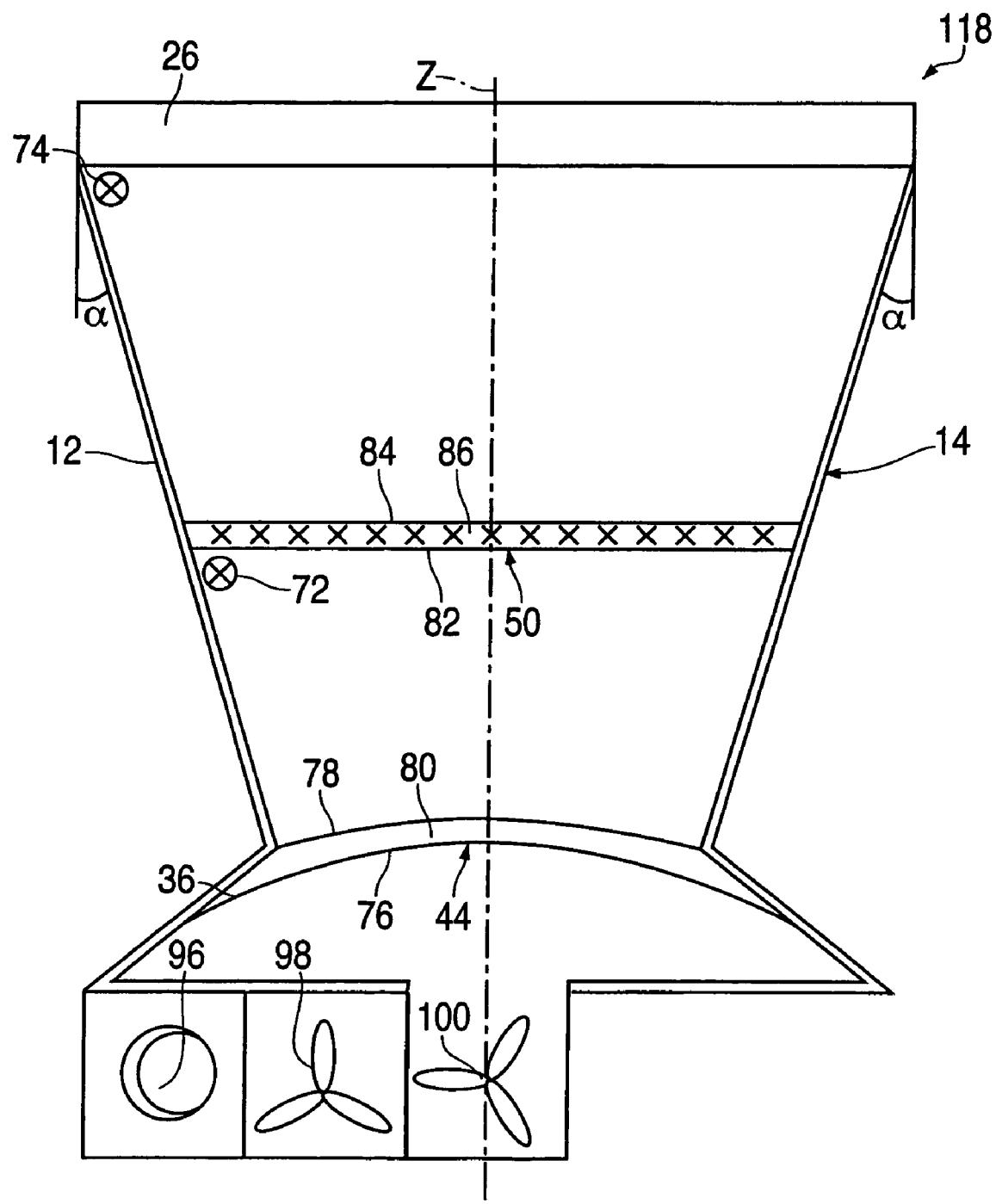
FIG. 5 is a top view of a trapezoid settler in accordance with another embodiment of the present invention.

Referring now to FIG. 5, a top view of a trapezoid settler 118, similar to the embodiments depicted in FIGS. 1-4, is illustrated in accordance with an alternative embodiment of the invention. Whereas the embodiments depicted in FIGS. 1-4 illustrate a trapezoid settler apparatus 10 resulting from the retrofitting of a rectangular settler, the embodiment illustrated in FIG. 5 is a non-retrofitted embodiment. As illustrated in FIG. 5, the settler apparatus 118 contains only the sidewalls 12 and 14.

Figure 6:
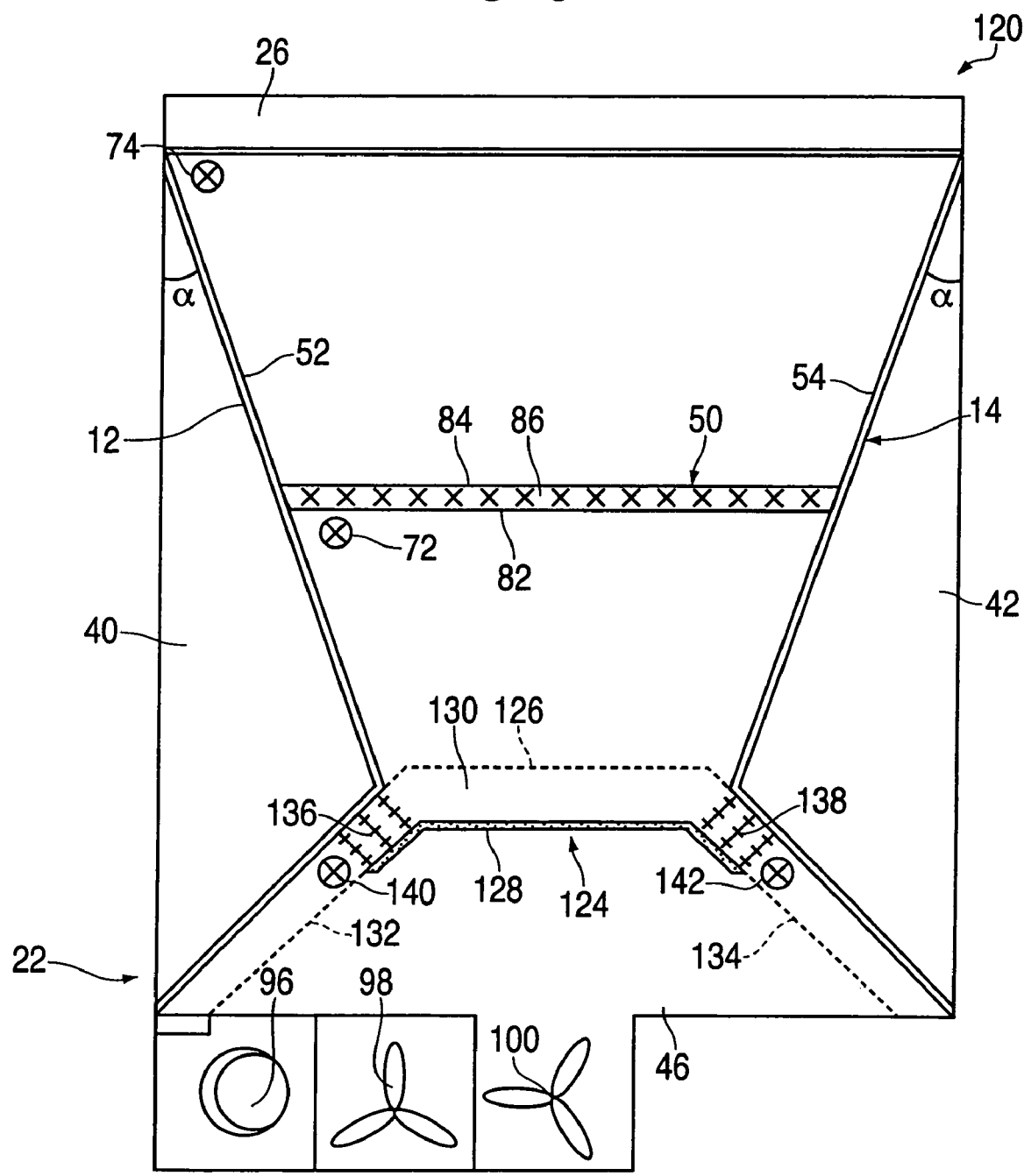
FIG. 6 is a top view of a trapezoid settler with an influent channel distributor in accordance with yet another embodiment of the present invention.
Figure 7:
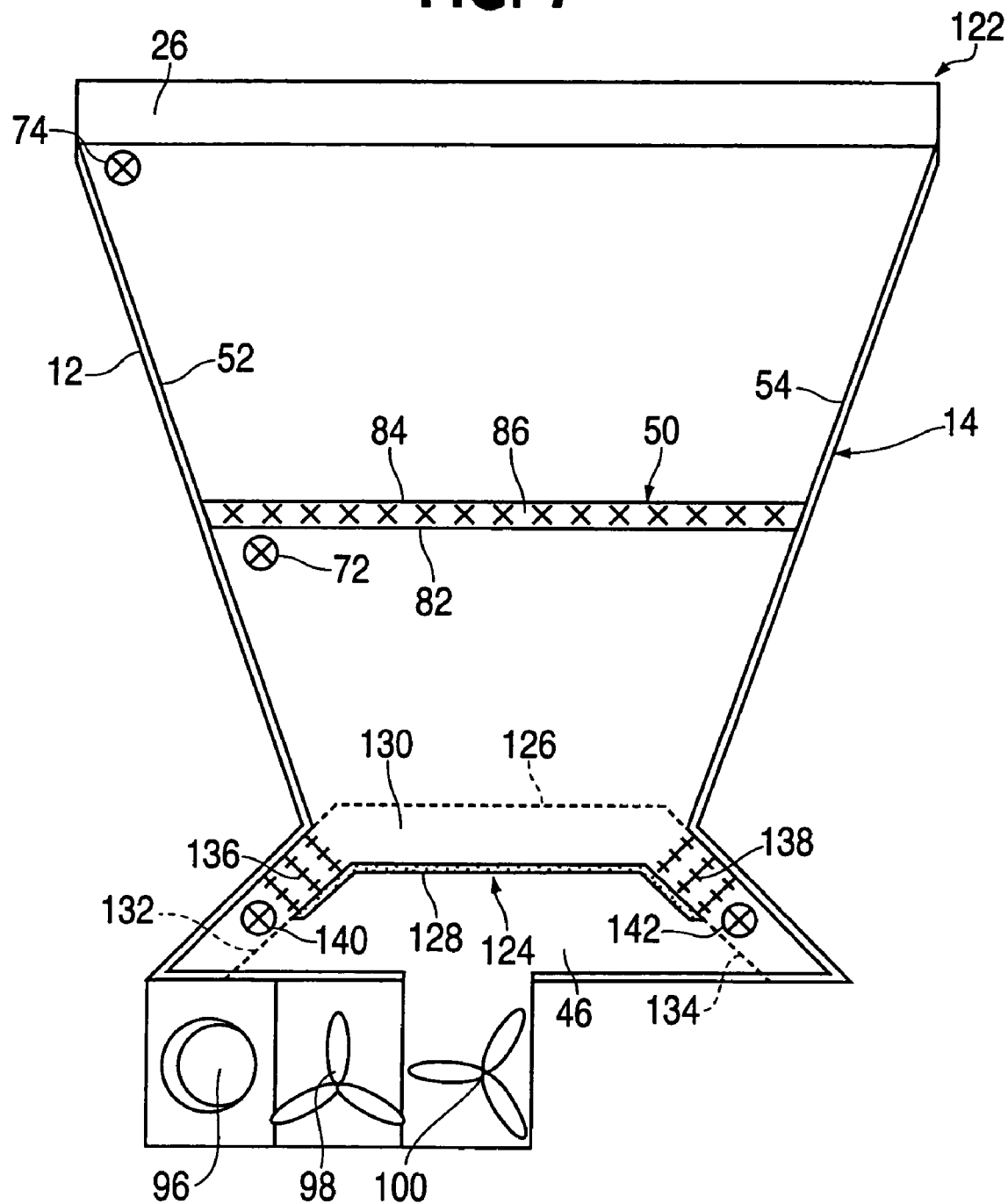
FIG. 7 is a top view of a trapezoid settler with an influent channel distributor in accordance with still another embodiment of the present invention.

Referring now to FIGS. 6 and 7, FIG. 6 depicts a retrofit trapezoid settler 120 with an influent channel distributor 124 while FIG. 7 depicts a non-retrofit trapezoid settler 122 with an influent channel distributor 124. The trapezoid settlers 120 and 122 depicted in FIGS. 6 and 7 are similar to those embodiments previously discussed except they have an influent channel distributor 124 rather than the primary coalescence fence 44. The influent channel distributor 124 functions to channel influent flow to the sides 12 and 14 of the inlet compartment 46 of the settlers 120 and 122.

As illustrated in FIGS. 6 and 7, the influent channel distributor 124 has an outlet screen 126 extending from the inner face 52 of the first side wall 12 to the inner face 54 of the second side wall 14. The settlers 120 and 122 also include a barrier 128 that is located upstream of the outlet screen 126, which functions to divert flow to the sides of the inlet compartment 46. The barrier 128 combines with the outlet screen 126 to form a channel 130 located between the outlet screen 126 and the barrier 128. The barrier 128 includes two inlet screens 132 and 134, each connected to one of its ends, which are preferably offset from the sides of the inlet compartment 46 as illustrated in FIG. 7. The inlet screens 132 and 134 function as gateways to the channel 130 and also provide for headloss and aid in coalescence. The channel 130 also includes media 136 and 138 which is disposed within the right and left portions of the channel 130. The packed media 136 and 138 functions to provide additional headloss and also aids in coalescence. Crud removal systems 140 and 142 can be placed just upstream of the packed media 136 and 138, as illustrated, in order to remove crud accumulation in the channel 130, however the crud removal systems 140 and 142 are not required.

Fabrication and/or construction of the settler 10 embodiments depicted in FIGS. 1-7 can be accomplished using metal, plastic, fiber reinforced plastic or any other suitable material as desired. Connections between parts can be accomplished by welding, bolting, riveting, screwing, or any other suitable method as desired.

Also, although an example of the trapezoid settler 10 is shown using parabolic primary coalescence fence 44, it will be appreciated that other fence designs can be used. Furthermore, although the trapezoid settler 10 is useful to separate an organic phase from an aqueous phase, it can also be used to separate to immiscible organic phases, for example.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A trapezoid settler having a longitudinal axis that extends between an upstream region and a downstream region and a transverse plane generally normal to the longitudinal axis, comprising:

a base the lies in a generally horizontal plane, wherein the base has a downstream end and an upstream end;

a weir assembly located at the downstream end of the base at a first axial position;

a first side wall, having a first inner face, that extends between the upstream end of the base and the weir assembly, wherein the first side wall is oriented at a first angle to the longitudinal axis and wherein said first angle is greater than zero degrees;

a second side wall opposing the first side wall, having a second inner face, that extends between the upstream end of the base and weir assembly, wherein the second side wall is oriented at a second angle to the longitudinal axis and wherein said second angle is greater than zero degrees; and a first coalescence fence connected to the first side wall and the second side wall, wherein the first coalescence fence extends between the inner face of the first and second side walls at a second axial position along the longitudinal axis, wherein the first coalescence fence comprises:

a first screen;

a second screen oriented generally parallel to the first screen; and a media disposed between the first screen and the second screen;

wherein the first and second side walls each respectively comprise first sections that extend at angles inwardly, toward one another, as they extend from the upstream end of the base toward the first coalescence fence, respectively.

2. The trapezoid settler of claim 1, further comprising a second coalescence fence having two ends connected to the first side wall and the second side wall, wherein the second coalescence fence extends between each inner face of the first and second side walls at a third axial position along the longitudinal axis.

3. The trapezoid settler of claim 2, further comprising a first crud removal system positioned at a fourth axial location along the longitudinal axis upstream of the second coalescence fence.

4. The trapezoid settler of claim 3, further comprising a second crud removal system positioned at a sixth axial location along the longitudinal axis upstream of the first coalescence fence, and a third crud removal system positioned at a seventh axial location along the longitudinal axis upstream of the weir assembly.

5. The trapezoid settler of claim 2, wherein the second coalescence fence comprises:
a variable permeability screen;
a first jacking screw located on one of the two ends of the second coalescence fence; and
a second jacking screw located on the other end of the second coalescence fence wherein the jacking screws translate the second coalescence fence along the vertical axis.

6. The trapezoid settler of claim 2, wherein the second coalescence fence and weir assembly are angled to the axial axis.

7. The trapezoid settler of claim 6, wherein the second coalescence fence and weir assembly are positioned at an angle to the transverse plane equal to approximately zero degrees to approximately ten degrees.

8. The trapezoid settler of claim 2, further comprising a first recycle launder located at a fourth axial location along the longitudinal axis downstream of the second coalescence fence.

9. The trapezoid settler of claim 8, further comprising a second recycle launder located at a fifth axial location along the longitudinal axis upstream of the weir assembly.

10. The trapezoid settler of claim 1, wherein the first coalescence fence is generally parabolic in shape.

11. The trapezoid settler of claim 1, wherein the first coalescence fence is generally trapezoid in shape.

12. The trapezoid settler of claim 1, wherein the inlet screen, the outlet screen, and the media are metal.

13. The trapezoid settler of claim 1, wherein the inlet screen, the outlet screen, and the media are plastic.

14. The trapezoid settler of claim 1, wherein the base is sloped at an angle to the horizontal plane.

15. The trapezoid settler of claim 1, wherein the angle of the first side wall and second side wall to the longitudinal axis is equal to approximately zero degrees to approximately eighty-two degrees.

16. A trapezoid settler having a longitudinal axis that extends between an upstream region and a downstream region and a transverse plane generally normal to the longitudinal axis, comprising:
a base that lies in a generally horizontal plane, wherein the base has a downstream end and an upstream end;
a weir assembly located at the downstream end of the base at a first axial position;
a first side wall, having a first inner face, that extends between the upstream end of the base and the weir assembly, wherein the first side wall is oriented at a first angle to the longitudinal axis and wherein said first angle is greater than zero degrees;
a second side wall opposing the first side wall, having a second inner face, that extends between the upstream end of the base and the weir assembly, wherein the second side wall is oriented at a second angle to the longitudinal axis and wherein said second angle is greater than zero degrees; and
a first coalescence fence connected to the first side wall and the second side wall, wherein the first coalescence fence extends between each inner face of the first and second side walls at a second axial position along the longitudinal axis, wherein the first coalescence fence comprises:
a first screen;
a second screen oriented generally parallel to the first screen; and
a media disposed between the first screen and the second screen, wherein the angle of the first side wall and second side wall to the longitudinal axis is equal to approximately eleven to approximately seventeen degrees.

17. A trapezoid settler having a longitudinal axis that extends between an upstream region and a downstream region and a transverse plane generally normal to the longitudinal axis, comprising:
a base the lies in a generally horizontal plane, wherein the base has a downstream end and an upstream end;
a weir assembly located at the downstream end of the base at a first axial position;
a first side wall, having a first inner face, that extends between the upstream end of the base and the weir assembly, wherein the first side wall is oriented at a first angle to the longitudinal axis and wherein said first angle is greater than zero degrees;
a second side wall opposing the first side wall, having a second inner face, that extends between the upstream end of the base and weir assembly, wherein the second side wall is oriented at a second angle to the longitudinal axis and wherein said second angle is greater than zero degrees; and
an influent channel distributor connected to the first side wall and the second side wall, wherein the influent channel distributor extends between each inner face of the first and second side wall at a first axial position along the longitudinal axis, wherein the influent channel distributor comprises:
a first screen;
a second screen oriented generally parallel to the first screen;
a third screen oriented generally parallel to the second side wall and opposed to the second screen and
a barrier located upstream of the first screen,
wherein the first and second side walls each respectively comprise first sections that extend at angles inwardly, toward one another, as they extend from the upstream end of the base toward the first influent channel distributor, respectively.

18. A trapezoid settler having a longitudinal axis that extends between an upstream region and a downstream region and a transverse plane generally normal to the longitudinal axis, comprising:
a base the lies in a generally horizontal plane, wherein the base has a downstream end and an upstream end wall;
a weir assembly located at the downstream end of the base at a first axial position;
a first side wall, having a first inner face, that extends between the upstream end wall of the base and the weir assembly, wherein the first side wall is oriented at a first angle to the longitudinal axis and wherein said first angle is greater than zero degrees;

a second side wall opposing the first side wall, having a second inner face, that extends between the upstream end of the base and weir assembly, wherein the second side wall is oriented at a second angle to the longitudinal axis and wherein said second angle is greater than zero degrees; and a first coalescence fence connected to the first side wall and the second side wall, wherein the first coalescence fence extends between the inner face of the first and second side walls at a second axial position along the longitudinal axis, wherein the first coalescence fence comprises:

a first screen;

a second screen oriented generally parallel to the first screen; and a media disposed between the first screen and the second screen;

wherein the first and second side walls each respectively comprise first sections that extend at angles inwardly, toward one another, as they extend from the upstream end wall of the base toward the first coalescence fence, respectively.

19. A trapezoid settler having a longitudinal axis that extends between an upstream region and a downstream region and a transverse plane generally normal to the longitudinal axis, comprising:

a base the lies in a generally horizontal plane, wherein the base has a downstream end wall and an upstream end;

a weir assembly located at the downstream end wall of the base at a first axial position;

a first side wall, having a first inner face, that extends between the upstream end of the base and the weir assembly, wherein the first side wall is oriented at a first angle to the longitudinal axis and wherein said first angle is greater than zero degrees;

a second side wall opposing the first side wall, having a second inner face, that extends between the upstream end of the base and weir assembly, wherein the second side wall is oriented at a second angle to the longitudinal axis and wherein said second angle is greater than zero degrees; and an influent channel distributor connected to the first side wall and the second side wall, wherein the influent channel distributor extends between each inner face of the first and second side wall at a first axial position along the longitudinal axis, wherein the influent channel distributor comprises:

a first screen;

a second screen oriented generally parallel to the first screen;

a third screen oriented generally parallel to the second side wall and opposed to the second screen and a barrier located upstream of the first screen, wherein the first and second side walls each respectively comprise first sections that extend at angles inwardly, toward one another, as they extend from the downstream end wall of the base toward the first influent channel distributor, respectively.

* * * * *